April 19, 1966 E. E. JUDGE, JR 3,246,904
SWIVEL JAW FOR DRIVING HEAD
Filed May 23, 1963
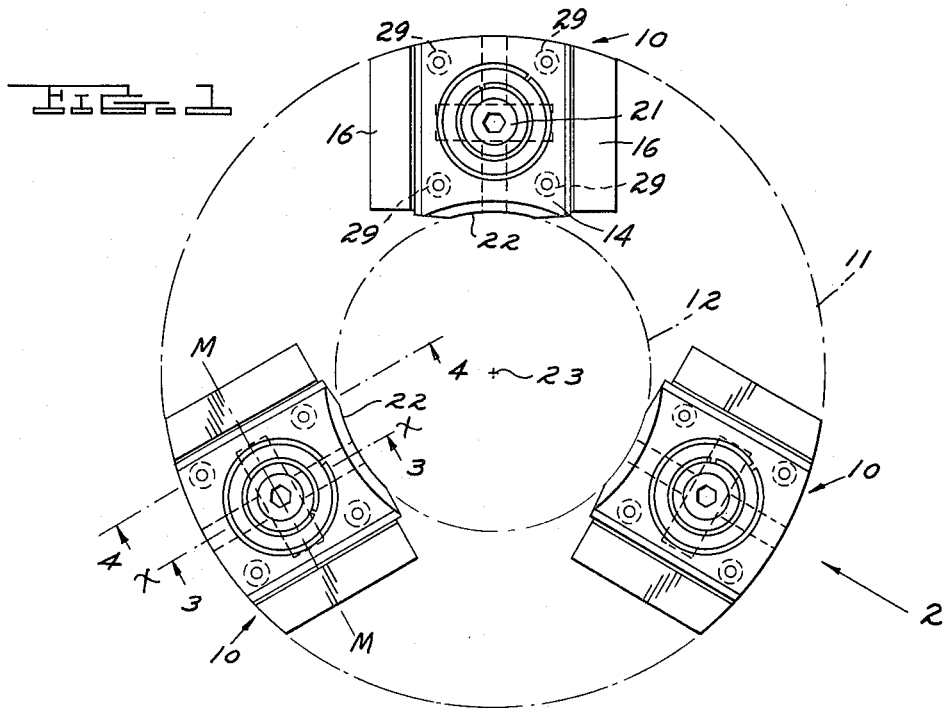
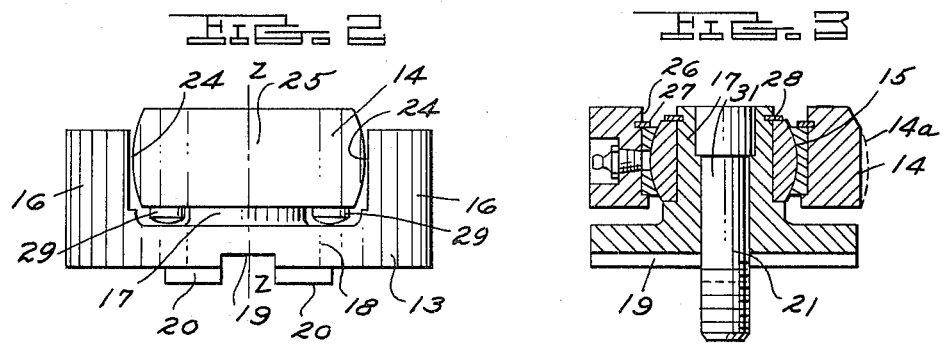
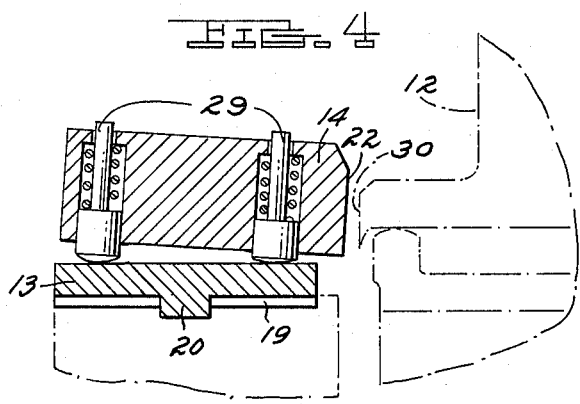
INVENTOR.
EDWARD E. JUDGE, JR.
BY Farley, Forster
and Farley
ATTORNEYS

United States Patent Office 3,246,904
Patented Apr. 19, 1966

3,246,904
SWIVEL JAW FOR DRIVING HEAD
Edward E. Judge, Jr., 2104 Cumberland Road,
Lansing, Mich.
Filed May 23, 1963, Ser. No. 282,732
9 Claims. (Cl. 279—123)

This invention relates to a swivel jaw construction for use in standard chucks or special adapters in multiples of two or more where it is necessary to grip a part to restrain it from axial and rotative movement relative to the jaws while permitting some freedom of movement about the center of clamping.

Applications for such swivel jaw are found in the processing, machining, straightening of parts, etc. For example, in the specific application of straightening axle shafts, it may be desired to engage the flange of the axle shaft in a rotatable chuck for driving the axle shaft while radial deflective forces are applied between spaced support bearings causing the axis of the shaft to undulate and the axis of the flange portion of the shaft to extend angularly relative to the axis of rotation of the chuck while deflective pressures are applied and to gradually move into alignment therewith as radial deflective forces are relaxed in completing the straightening operation. Thus a limited degree of universal movement is required between the flange and the chuck for accommodating deflection of the flange axis while the flange is maintained in a fixed axial position and positively rotated about a fixed center of rotation.

The present swivel jaw construction is adapted to provide such limited universal movement when employed in multiples of two or more in a standard chuck or adapter by the combination of a rigid base element having a slot or keyway engagement for radial adjustment together with a work piece engaging jaw element mounted on the base element with a spherical bearing. The work piece engaging face of the jaw is provided with a suitable arcuate surface spaced radially of the spherical bearing and the jaw element is confined against swivel movement about an axis parallel to the chuck axis by side rails on the base which also assist the bearing in imparting driving force to the jaw element. Resilient plungers reacting between the jaw and base elements bias the jaw element to a position appropriate for initial engagement of the work piece while accommodating the limited degree of swivel action required of the jaw in operation.

The foregoing and other objects of the present swivel jaw constructions may best be understood by reference to a specific preferred embodiment disclosed in the drawings wherein:

FIGURE 1 is a face view of three jaw assemblies with 120 degree spacing showing their orientation relative to a work piece and driving chuck;

FIGURE 2 is a radial view taken along the line 2 of FIGURE 1;

FIGURE 3 is a sectional view taken along the line 3—3 of FIGURE 1; and

FIGURE 4 is a sectional view taken along the line 4—4 of FIGURE 1.

Referring to FIGURE 1 three jaw assemblies 10 mounted on chuck 11 are shown in a position for engaging work piece 12. As best shown in FIGURES 2, 3 and 4, each jaw assembly comprises a base 13, a jaw 14 and an interconnecting spherical bearing 15. The base 13 comprises a pair of side rails 16 and central bearing mount 17 joined by a transverse base element 18 having radial slot 19 and transverse key 20 elements integrally formed therein to engage mating keys and slots in a standard chuck or special adapter, not shown, the jaws being secured in adjusted position by Allen head screws 21 passing through the center of the bearing mount 17. Each jaw element 14 has an arcuate work piece engaging face 22 substantially concentric with the center of rotation 23, a pair of arcuate side surfaces 24 which are substantially cylindrical segments having a radial axis 25 passing through the center of the spherical bearing 15, and having a cylindrical seat 26 for the outer race of the spherical bearing 15, the bearing mount 17 having secured thereon the inner race of such bearing, the races being retained respectively by snap rings 27 and 28.

As best shown in FIGURE 4 the jaw element 14 is preferably provided with a plurality of spring loaded plungers 29 reacting against the base element 18 serving to orient each jaw element 14 in its free condition for a desired position of initial engagement with the work piece 12. While the angle of inclination of such jaw elements to the plane of chuck rotation will normally be zero degrees in order to accommodate equal oscillation on either side of the plane of rotation of the chuck, the jaws may be biased as shown to provide some initial inclination to such plane where the maximum oscillation is greater on one side than the other. The side rails 16 serve not only to orient the jaw elements with the work piece engaging faces 22 facing the center of rotation of the chuck, but also to assist the bearing 15 in driving the jaw elements and work pieces in a circumferential direction.

While the work piece engaging face 22 of the jaw elements may be substantially a cylindrical segment in configuration where a matching cylindrical perimeter 30 of the work piece 12 is sufficiently short in axial extension or crowned, it will be understood that such face may be contoured with a convex surface as shown at 14a in FIG. 3 to provide an engagement contact appropriately dimensioned relative to the centers 31 of the spherical bearings and co-planar center 23 of the work piece in order to provide a uniform pressure contact throughout all positions of oscillation of the work piece.

It will be understood from the above description of the preferred embodiment disclosed in the drawings that the swivel jaws 14 are free to oscillate to a limited extent about a radial axis, X—X as shown in FIG. 1 and normal to the plane of FIG. 2, as well as about an axis tangential to the circumferential path of the bearing center Y—Y in FIG. 1 and normal to the plane of FIG. 3, and that the jaws are confined against rotation about the third mutually perpendicular axis Z—Z in FIG. 2 normal to the plane shown in FIGURE 1 so that the jaws when engaged with a work piece will be effective to drive in a circumferential direction while accommodating a limited degree of universal movement to permit oscillation of the work piece axis away from the axis of rotation of the driving chuck.

While a preferred embodiment has been shown and described above in detail it will be understood that numerous modifications may be resorted to without departing from the scope of the invention as defined in the following claims.

I claim:

1. A multiple swivel jaw construction for use in a rotary chuck or adaptor characterized by a plurality of swivel jaws each having a base element adapted for radial sliding adjustment on said rotary chuck, a jaw element having a workpiece engaging face, a spherical bearing interposed between said base and jaw elements adapted to accommodate during rotation of an engaged workpiece a limited relative swivel movement between each of said jaw and base element about mutually perpendicular axes through the center of said spherical bearing extending radially and tangentially to the circumferential path of said center about the rotary axis, and means for preventing swivel movement about an axis parallel to said rotary axis.

2. A multiple swivel jaw construction as set forth in claim 1 said last means including inter-engaging surfaces between said base and jaw elements preventing relative rotation about the third mutually perpendicular axis passing through the center of said spherical bearing.

3. A multiple swivel jaw construction as set forth in claim 1 said last means including inter-engageable parallel side rails and side surfaces on each of said base and jaw elements preventing relative rotation therebetween about the third mutually perpendicular axis passing through the center of said spherical bearing.

4. A swivel jaw construction as set forth in claim 3 wherein said side surfaces on said jaw element are formed as cylindrical segments having a common axis passing through the center of said spherical bearing.

5. A multiple swivel jaw construction for use in a rotary chuck or adaptor characterized by a plurality of swivel jaws each having a base element adapted for radial sliding adjustment on said rotary chuck, a jaw element having a workpiece engaging face, and a spherical bearing interposed between said base and jaw elements adapted to accommodate during rotation of an engaged workpiece a limited relative swivel movement between said jaw and base element about mutually perpendicular axes through the center of said spherical bearing extending radially and tangentially to the circumferential path of said center about the rotary axis, resilient means being interposed between said base and jaw elements biasing them to a predetermined relative position when free of workpiece engagement.

6. A multiple swivel jaw construction as set forth in claim 5 wherein said resilient means comprise a plurality of spring-loaded plungers inter-acting between said base and jaw elements.

7. A multiple swivel jaw construction for use in a rotary chuck or adaptor characterized by a plurality of swivel jaws each having a base element adapted for radial sliding adjustment on said rotary chuck, a jaw element having a workpiece engaging face, and a spherical bearing interposed between said base and jaw elements adapted to accommodate during rotation of an engaged workpiece a limited relative swivel movement between said jaw and base elements about mutually perpendicular axes through the center of said spherical bearing extending radially and tangentially to the circumferential path of said center about the rotary axis, said spherical bearing including inner and outer races and said base element being provided with a rigid integral bearing mount extending within said jaw element for holding the inner race of said spherical bearing.

8. A multiple swivel jaw construction as set forth in claim 7 including inner-engageable parallel side rails and side surfaces on said base and jaw elements preventing relative rotation therebetween about the third mutually perpendicular axis passing through the center of said spherical bearing, and said bearing and one of said side rails being adapted to provide driving torque to said jaw element.

9. A multiple swivel jaw construction as set forth in claim 8 wherein said bearing mount has an anchor screw passing therethrough for tightening the swivel jaw assembly in its adjusted position on the chuck or adaptor.

References Cited by the Examiner
UNITED STATES PATENTS

| | | | |
|---|---|---|---|
| 305,263 | 9/1884 | Amidon | 279—5 |
| 546,439 | 9/1895 | Tucker | 279—5 |
| 652,961 | 7/1900 | Garvey | 279—123 |
| 1,182,780 | 5/1916 | Limpert | 269—258 |
| 1,844,616 | 2/1932 | Whiton | 279—123 |
| 1,952,206 | 3/1934 | Hogg | 279—123 |
| 2,158,490 | 5/1939 | Webster | 279—123 |
| 3,030,104 | 4/1962 | Chudy | 269—258 |

LESTER M. SWINGLE, *Primary Examiner.*

ROBERT C. RIORDON, *Examiner.*

H. V. STAHLHUTH, *Assistant Examiner.*